(12) United States Patent
Cote (10) Patent No.: US 8,485,130 B2
(45) Date of Patent: Jul. 16, 2013

(54) TUBE BIRD FEEDER (76) Inventor: Paul L. Cote, Lac Brome (CA)

( * ) Notice: Subject to any disclaimer, the term of this patent is extended or adjusted under 35 U.S.C. 154(b) by 229 days.

(21) Appl. No.: 12/924,846

(22) Filed: Oct. 6, 2010

(65) Prior Publication Data
US 2011/0083609 A1 Apr. 14, 2011

(30) Foreign Application Priority Data
Oct. 9, 2009 (CA) ...................................... 2682025

(51) Int. Cl.
A01K 39/01 (2006.01)
(52) U.S. Cl.
USPC ....................................................... 119/57.8

(58) Field of Classification Search
USPC ........................................ 119/52.2, 57.9, 57.8
See application file for complete search history.

(56) References Cited

U.S. PATENT DOCUMENTS

| 6,543,383 | B1 * | 4/2003 | Cote | 119/57.8 |
| 2005/0211177 | A1 * | 9/2005 | Bescherer | 119/57.8 |
| 2007/0227453 | A1 * | 10/2007 | Puckett et al. | 119/57.8 |
| 2007/0266950 | A1 * | 11/2007 | Walsh | 119/57.8 |
| 2008/0078329 | A1 * | 4/2008 | Hunter et al. | 119/57.8 |

* cited by examiner

Primary Examiner — Son T Nguyen
(74) Attorney, Agent, or Firm — Eric Fincham (57) ABSTRACT A tube bird feeder comprising a seed tube having an open top and an open bottom, a cover fitting on top of the seed tube to cover the open top, a base portion which is removably secured to the side wall, and a removable seed port structure mounted in a seed access opening.

8 Claims, 9 Drawing Sheets

TUBE BIRD FEEDER

FIELD OF THE INVENTION

The present invention relates to bird feeders, and more particularly relates to tube bird feeders.

BACKGROUND OF THE INVENTION

Tube bird feeders are well known in the art. They have received a high degree of acceptance due to the fact that they are relatively inexpensive.

One of the problems associated with all types of bird feeders is cleanliness. Unless proper design is used, the seed can, over a period of time, become mouldy. It is also subject to contamination by bird droppings. If proper care is not exercised, this can lead to illness among the bird population using the feeder.

Since the tube bird feeder is relatively inexpensive, it is usually manufactured in a sealed arrangement with access to the various components being difficult if not impossible.

SUMMARY OF THE INVENTION

It is an object of the present invention to provide a tube bird feeder wherein the bird feeder can be readily assembled and disassembled for cleaning purposes.

It is a further object of the present invention to provide a tube bird feeder having a separate seed port assembly which may be easily assembled and disassembled with respect to the seed tube.

According to one aspect of the present invention, there is provided a bird feeder comprising a seed tube having an open top and an open bottom, at least one seed access opening in a side wall of the seed tube, a cover fitting on top of the seed tube to cover the open top, a base portion removably secured to the side wall and covering the open bottom, and a removable seed port structure mounted in the at least one seed access openings.

The bird feeder of the present invention may utilize a conventional seed tube having an open top and an open bottom. Conventionally, the seed tubes are formed of a plastic material and are transparent in nature.

The base portion of the present invention is characterized by being removably attached to the seed tube. In so doing, the base may be removed and is thus relatively easy to clean. Preferably, the base is held in position by a pair of spring loaded elements which engage with apertures formed proximate the bottom of the seed tube.

A cover is designed to fit on top of the seed tube to cover the open end. The cover, as is conventional, is removable to provide access to the interior of the seed tube. The cover of the bird feeder of the instant invention is designed to have ventilation channels to permit the egress of air from within the seed tube to the outside.

The seed port assembly of the present invention is removably mounted on the seed tube. A preferred embodiment of the mounting of the seed port is illustrated in the accompanying drawings and description thereof.

BRIEF DESCRIPTION OF THE DRAWINGS

Having thus generally described the invention, reference will be made to the accompanying drawings illustrating an embodiment thereof, in which.

DETAILED DESCRIPTION OF THE INVENTION

Referring to the drawings in greater detail and by reference characters thereto, there is illustrated a tube bird feeder and which tube bird feeder is generally designated by reference numeral 10.

Tube bird feeder 10 includes a cylindrical seed tube 12 which has an open top and an open bottom and includes a first seed access opening 14 with a second seed access opening 16 being located diametrically opposed to seed access opening 14.

Figure 7:
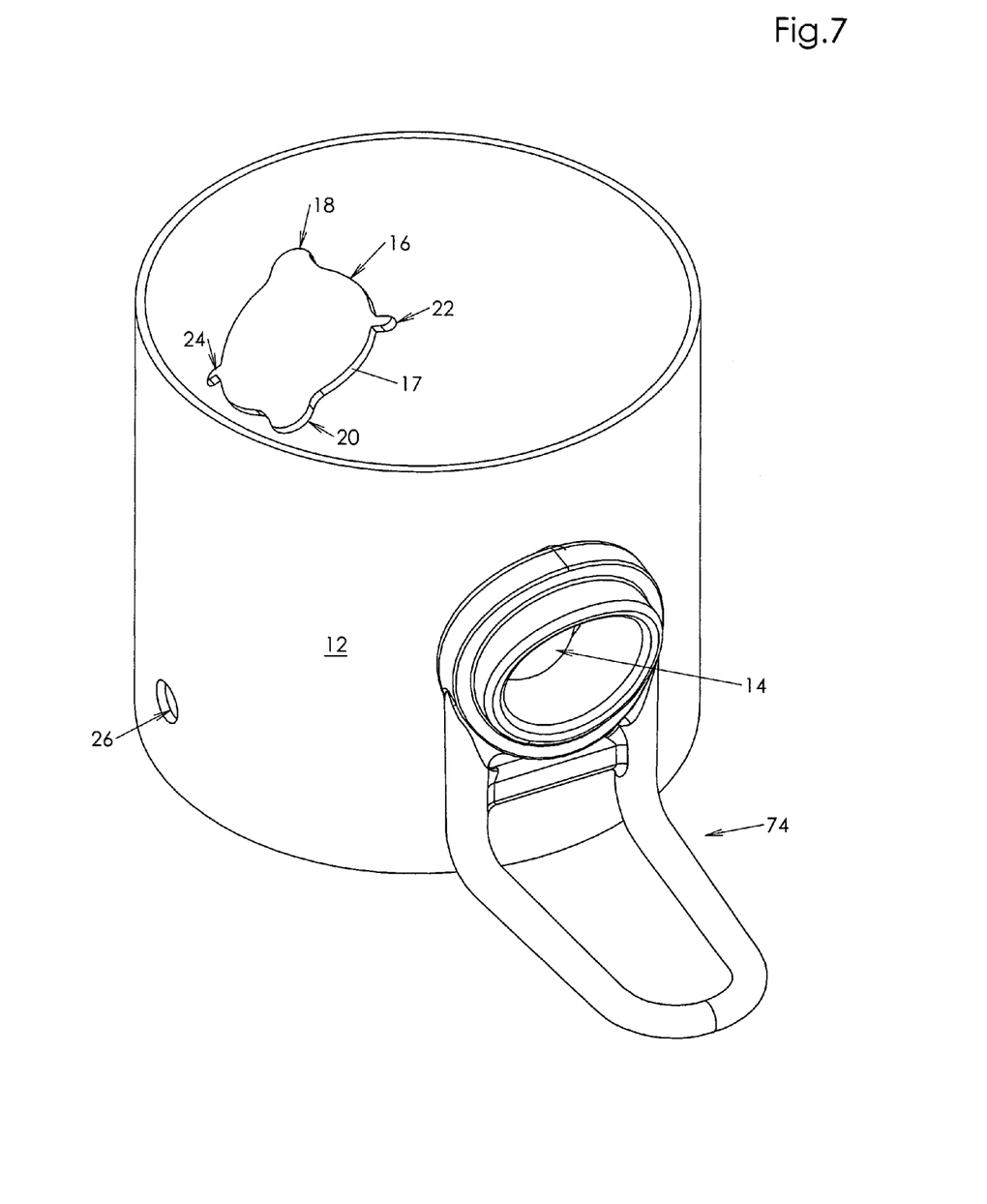
FIG. 7 is a detailed perspective view of the bottom portion of the seed tube.

As each of seed access openings 14 and 16 and related components are of identical structure, similar reference numerals will be used for similar components. As may be best seen in FIG. 7, each of access openings 14 and 16 have a generally circular outline, bounded by an edge 17. A first pair of recesses are formed in edge 17; an upper recess 18 and a lower recess 20. It will also be noted that there are also provided a second pair of side recesses 22 and 24 for reasons which will be discussed hereinbelow. Both the first set of recesses 18, 20 and second recesses 22, 24 are diametrically opposed.

Seed tube 12 also includes a pair of lower apertures 26 to receive a base as will be discussed hereinbelow and a pair of upper apertures 28 to receive a hanger support.

Figure 1:
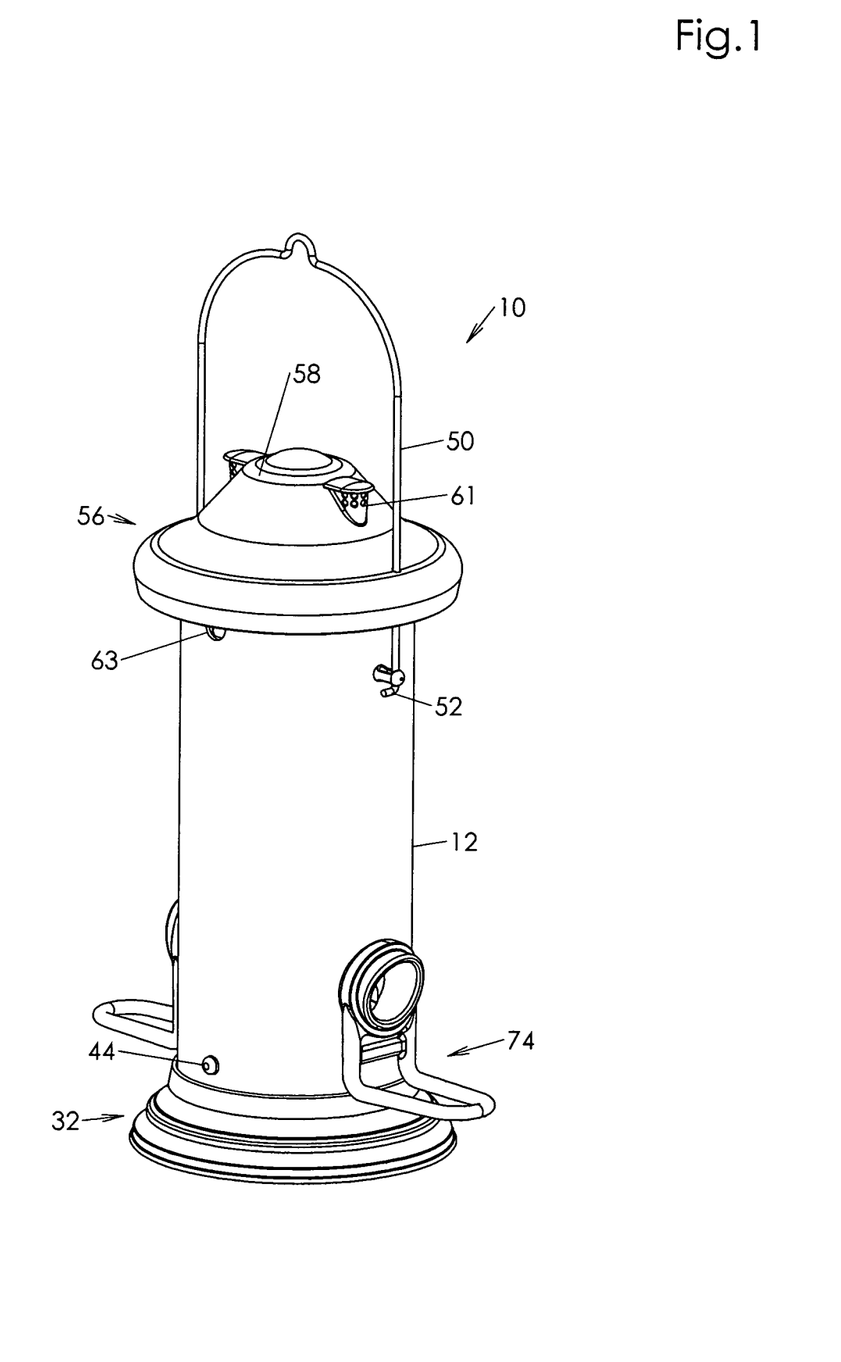
FIG. 1 is a perspective view of a bird feeder according to an embodiment of the present invention.
Figure 2:
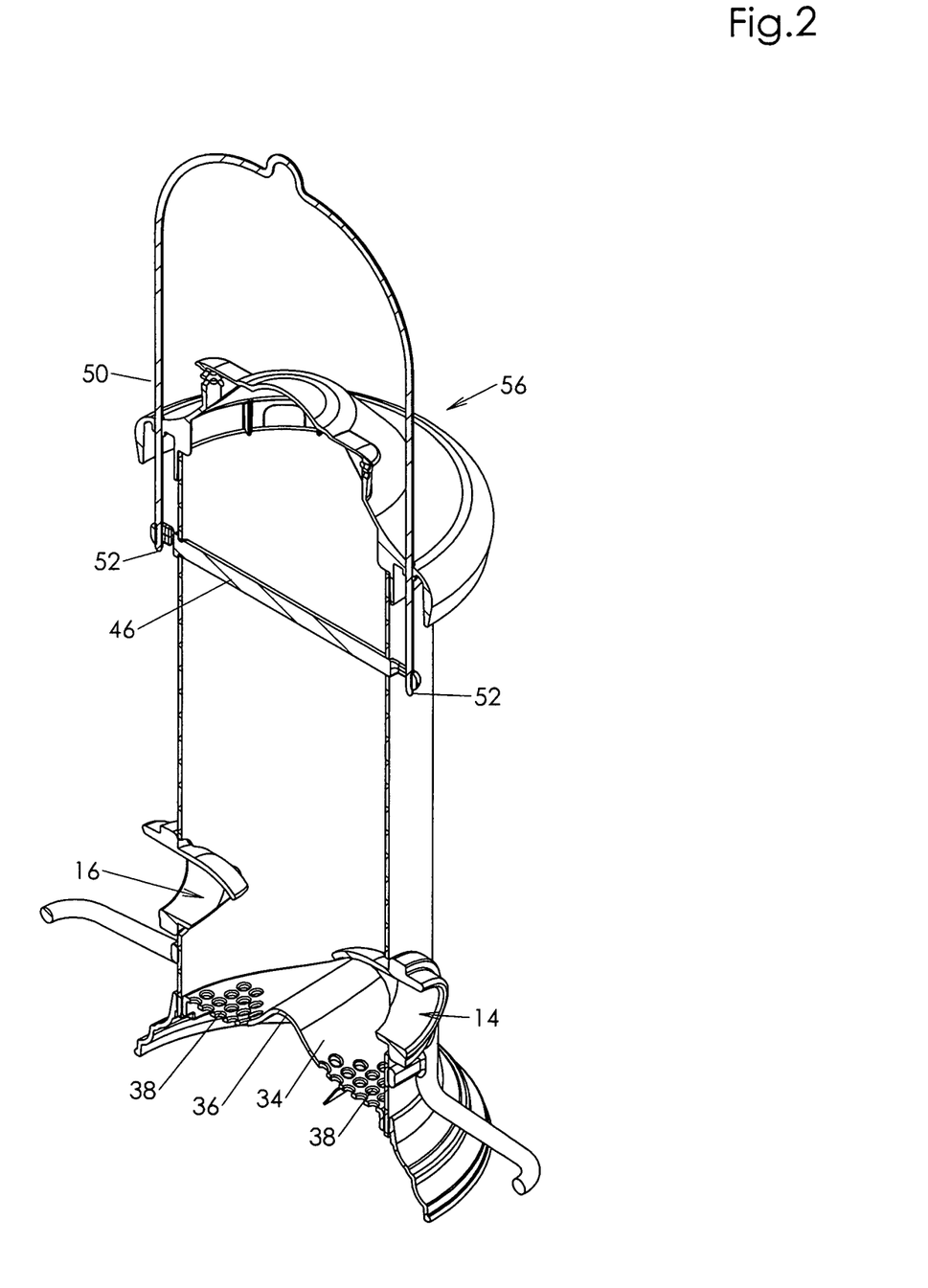
FIG. 2 is a perspective longitudinal cross sectional view of the bird feeder of FIG. 1.
Figure 3:
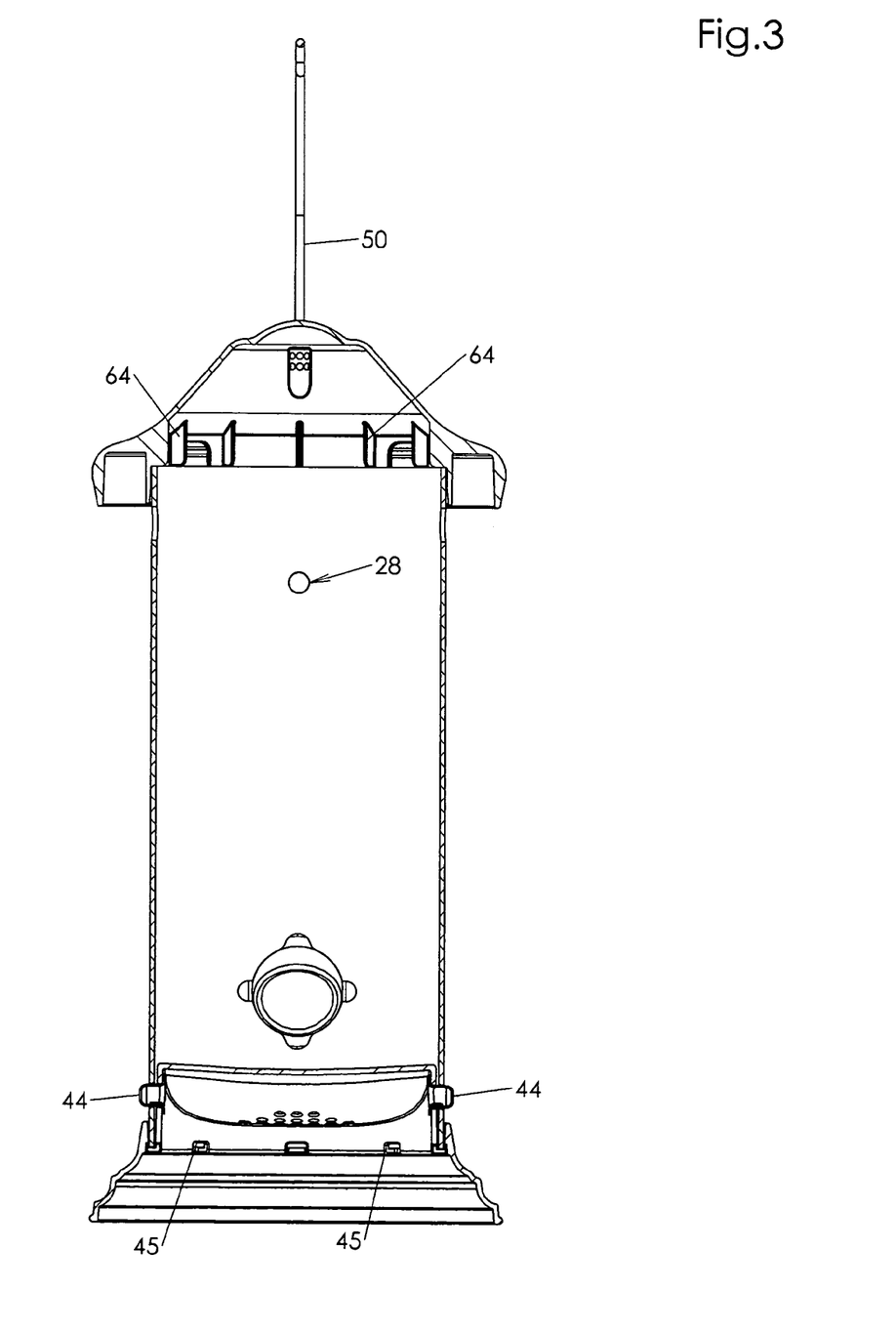
FIG. 3 is a side cross sectional view thereof.
Figure 4:
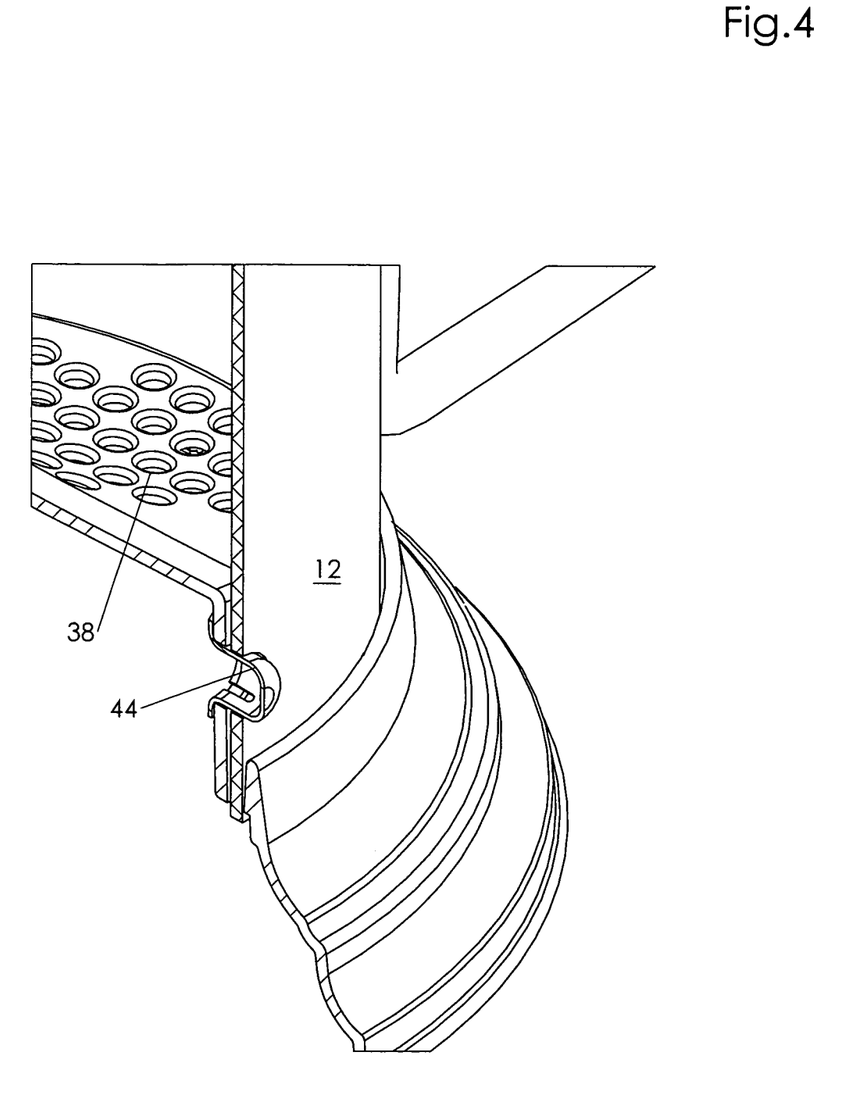
FIG. 4 is a detailed cross sectional view illustrating the securement of the base and seed tube.

Tube bird feeder 10 includes a base generally designated by reference numeral 32. Base 32 includes a bottom wall 34 which, as may be seen in FIG. 2, has a central raised portion 36 to direct the seeds to the sides adjacent access openings 14, 16. A plurality of drainage apertures 38 are formed in bottom wall 34.

Formed between bottom wall 34 and an outer wall 42 is a U-shaped recess 40 designed to receive the bottom portion of cylindrical feed tube 12. Base 32 also includes a pair of spring loaded elements 44 which are designed to engage within apertures 26. Spring loaded elements 44 are of a known structure wherein a spring interiorly thereof biases elements 44 outwardly such that they can engage with apertures 26. Base 32 can be removed by pushing spring loaded elements 44 inwardly and sliding the base structure downwardly. Drainage openings 45 are provided at the base of recess 40.

A hanger bar 46 engages within apertures 28 and is designed to receive a hanger 50 which has a hook structure 52 formed on either side thereof.

Figure 5:
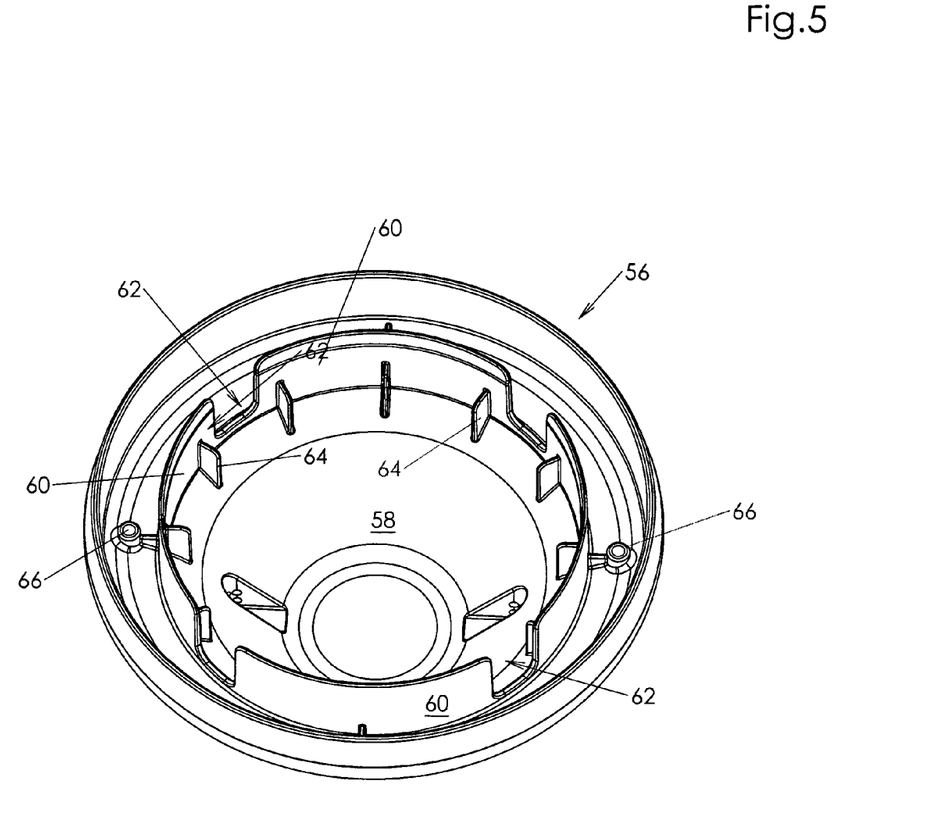
FIG. 5 is a perspective view of the underside of the cover.
Figure 6:
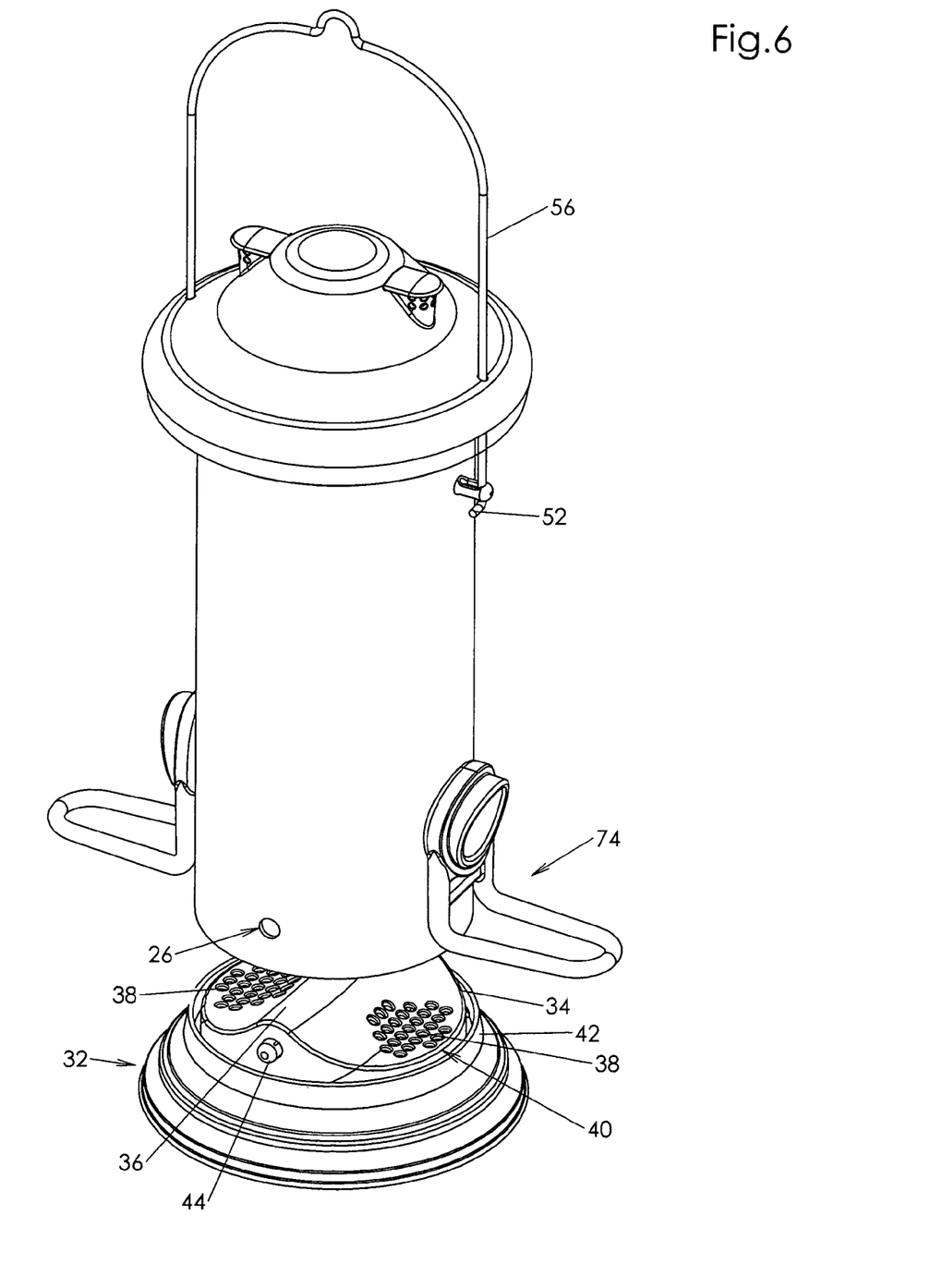
FIG. 6 is a perspective view illustrating the securing of the base and seed tube.

A cover is generally designated by reference numeral 56 and includes a domed upper portion 58. On its interior surface, cover 56 is provided with downwardly extending flanges 60 having openings 62 therebetween to permit ventilation of the interior of seed tube 12. Vents 61 may also be provided in cover 56 as well as vents 63 in an upper portion of the seed tube. It will be noted that there are a plurality of spacer flanges 64 to engage the upper marginal edge of seed tube 12 to maintain the position of cover 56. Formed within cover 56 are apertures 66 to receive hanger 50.

A pair of seed ports 74 are provided, one for each seed access opening 14 and 16. Since seed port structures 74 are identical, similar reference numerals are utilized for each seed port structure 74.

Figure 8:
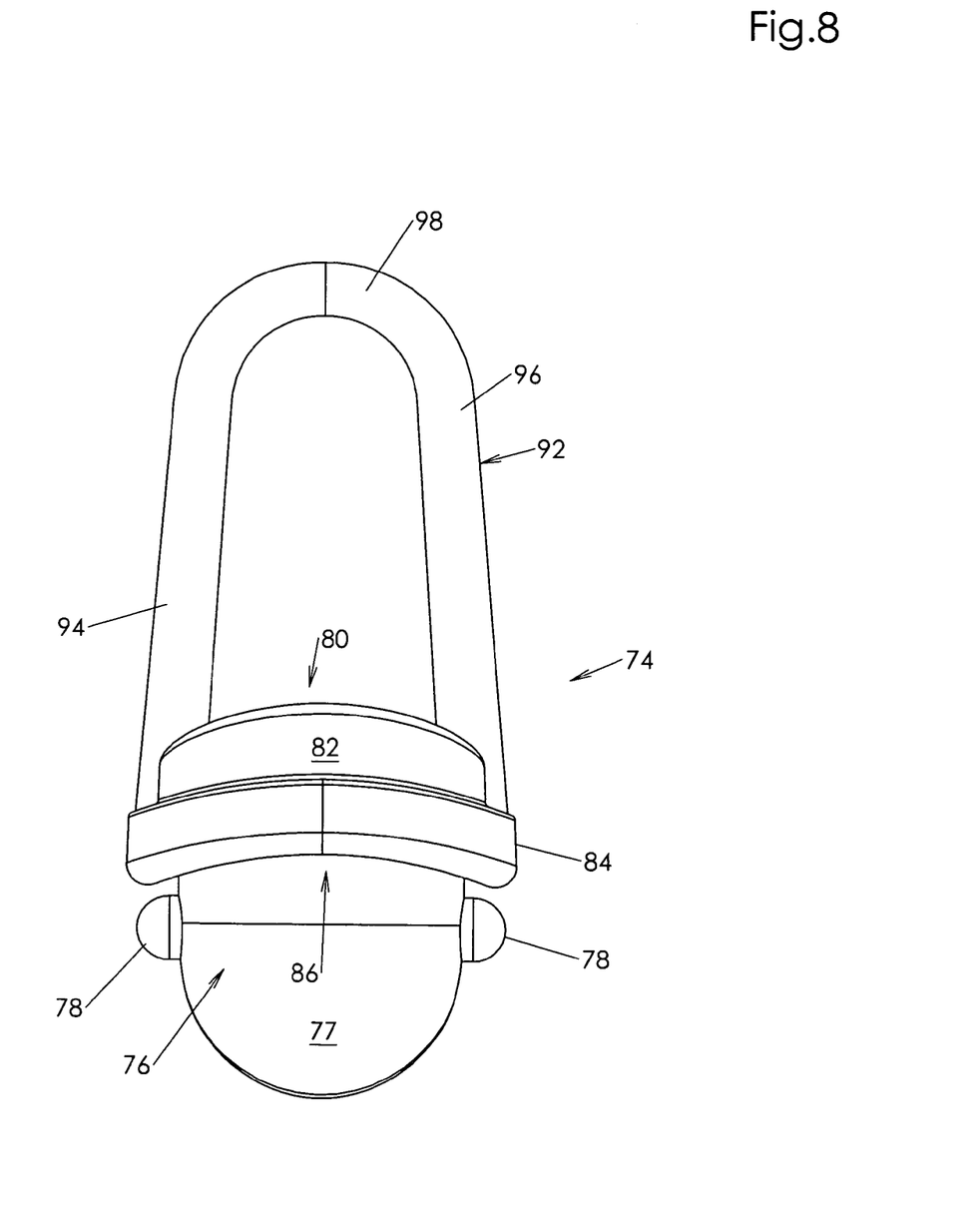
FIG. 8 is a top view of the seed port structure.
Figure 9:
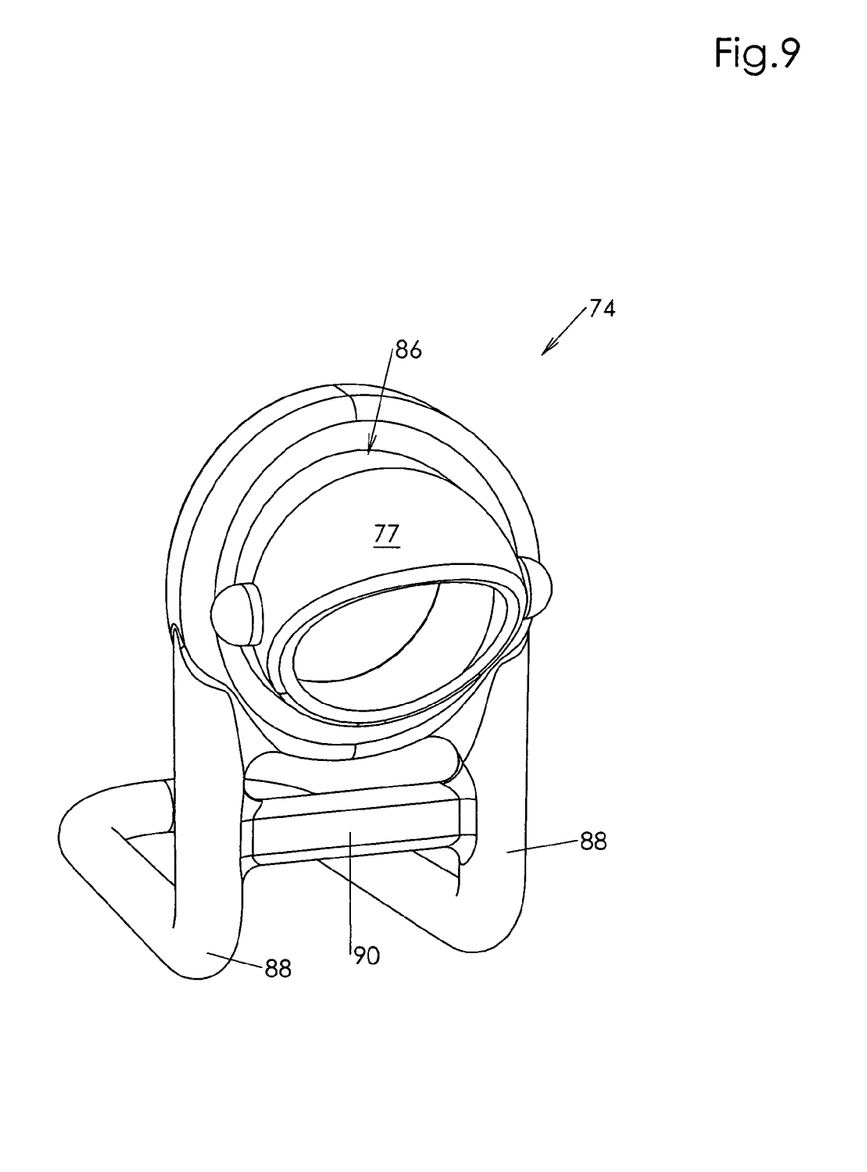
FIG. 9 is a perspective view of the seed port structure.

Each seed port structure 74 includes an inner baffle wall 76 which, as may be seen from FIGS. 8 and 9, has an upper portion 77 which extends inwardly in a known baffle arrangement. A pair of protrusions 78 extend outwardly from inner baffle wall 76. There is also provided an outer baffle wall 80 which in turn includes an outwardly extending top wall 82.

A frame 84 of seed port 74 provides a separation of outer baffle wall 80 from inner baffle wall 76. As will be noted from the drawings, there is provided a curved recess top portion 86 with legs 88 extending downwardly therefrom. A horizontal reinforcing member 90 extends between legs 88.

Seed port structure 74 includes an integrated perch 92 which includes a pair of horizontal legs 94 and 96 joined by an end portion 98. Assembly of the tube feeder 10 is accomplished by inserting seed port structures 74 such that inner baffle wall 76 is interiorly of cylindrical seed tube 12. This is done by passing protrusions 78 through recesses 18, 20 and then rotating the seed port structure 74 such that protrusions 78 rest in a position adjacent recesses 22, 24. Naturally the space between protrusions 78 and frame 84 receives seed tube 12.

Base 32 is then placed in position and spring loaded elements 44 may be pushed inwardly. Base 32 will then be positioned such that spring loaded elements 44 will engage apertures 26. Hanger bar 46 may be inserted through apertures 28 and hanger 50 mounted thereon.

It will be understood that the above described embodiment is for purposes of illustration only and that changes and modifications may be made thereto without departing from the spirit and scope of the invention.

I claim:

1. A bird feeder comprising:
   a seed tube having an open top and an open bottom, at least one seed access opening in a side wall of said seed tube;
   a cover fitting on top of said seed tube to cover said open top;
   a base portion removably secured to said side wall and covering said open bottom;
   a removable seed port structure mounted in said at least one seed access opening, said seed port structure comprising a frame member extending about said feed opening, an inner baffle wall extending inwardly of said seed tube, said inwardly extending baffle wall having a pair of protrusions thereon, an outer baffle wall extending exteriorly of said seed opening, said seed access opening being defined by a generally circular edge wall, a first pair of diametrically opposed recesses formed in said edge wall, said first pair of recesses being sized to permit said protrusions on said baffle wall to pass therethrough, a second set of recesses formed in said edge wall, said second set of recesses being diametrically opposed and being sized smaller than said first set of recesses; and
   the arrangement being such that said seed port structure can be secured to said seed tube by passing said pair of protrusions through said first set of recesses and rotating said seed port structure such that said pair of protrusions sit proximate said second set of recesses.

2. The bird feeder of claim 1 wherein said base portion includes first and second spring loaded elements extending outwardly from a side wall of said base portion, said spring loaded elements being biased outwardly, said seed tube having first and second apertures located near said bottom opening, each of said spring loaded elements engaging with one of said first and second apertures to hold said base portion in position.

3. The bird feeder of claim 1 wherein said removable seed port structure includes an integral perch.

4. The bird feeder of claim 1 wherein said first set of recesses are vertically aligned.

5. The bird feeder of claim 1 wherein said seed tube has a cylindrical configuration.

6. The bird feeder of claim 1 wherein said base has a U-shaped channel to receive said seed tube.

7. The bird feeder of claim 1 further including drainage openings in said base and ventilation openings in an upper portion of said bird feeder.

8. The bird feeder of claim 1 further including ventilation openings in said cover.

* * * * *